(12) United States Patent
Burkart et al.

(10) Patent No.: US 6,918,213 B2
(45) Date of Patent: Jul. 19, 2005

(54) PLASTIC PERGOLA END CAPS OF EXTENDED LENGTH

(75) Inventors: Michael G. Burkart, Denver, CO (US); Jeffrey G. Herion, Watkins, CO (US)

(73) Assignee: Stallion Fence Accessories, Denver, CO (US)

( * ) Notice: Subject to any disclaimer, the term of this patent is extended or adjusted under 35 U.S.C. 154(b) by 87 days.

(21) Appl. No.: 10/349,404

(22) Filed: Jan. 21, 2003

(65) Prior Publication Data

US 2004/0139664 A1 Jul. 22, 2004

Related U.S. Application Data

(60) Provisional application No. 60/376,658, filed on Apr. 29, 2002.

(51) Int. Cl.$^7$ .............................. E04B 7/00; E04D 13/00
(52) U.S. Cl. ............................................ 52/94; 52/93.2
(58) Field of Search ............................... 52/94, 93.2, 96

(56) References Cited

U.S. PATENT DOCUMENTS

| D464,438 S | 10/2002 | Skulsky | ........................ D25/57 |
| 2003/0041531 A1 * | 3/2003 | Seldon | ........................... 52/94 |

OTHER PUBLICATIONS

Picture of a scalloped pergola end cap by Kroy Building Products, Inc.; 2000–2001.
Picture of a pergola end cap by Modern Fence Technologies;, date unknown.

* cited by examiner

*Primary Examiner*—Rodney B. White
(74) *Attorney, Agent, or Firm*—Sheridan Ross P.C.

(57) ABSTRACT

The present invention discloses novel pergola end caps that appear to be unitary with the pergola beams to which they attach, and wherein the pergola end caps are: (a) slidably received on a squared off end of a pergola beam, (b) may include enhanced scalloping, and (c) has a length substantially greater than heretofore has been possible to cost effectively manufacture.

15 Claims, 8 Drawing Sheets

PLASTIC PERGOLA END CAPS OF EXTENDED LENGTH

RELATED FIELD OF INVENTION

The present invention relates to novel plastic pergola end caps and their method of manufacture.

BACKGROUND OF THE INVENTION

Wood pergolas wherein the horizontal pergola beams have scalloped or sculpted ends are well known. However, wood pergolas can be expensive to install and, additionally, require continuing maintenance such as painting. Further, such wood pergolas are susceptible to warping, splitting, insect damage (e.g., termites), etc. Accordingly, alternative materials such as plastics and composites are increasingly being used as a replacement for their wood counterparts in structures such as pergolas. Such plastic and/or composite counterparts can be both more cost effective to install and substantially maintenance free. However, it is generally recognized that purchasers of such alternatives to wood structures desire that the appearance of the alternatives to have an appearance that closely resembles the corresponding wood structure. In particular, purchasers or customers for such alternative structures desire the visual characteristics of beams of wood rather than unsightly plastic and/or composite seams where individual components are fitted together to simulate, e.g., wood pergola beams. Additionally, such plastic components may not fit together precisely enough to provide an ecstatically pleasing appearance of, e.g., a simulation of a solid beam having scalloped end portions. Thus, there is a need for advancements in plastic structural components and their manufacture to accommodate customers' preferences.

Regarding pergolas, the above analysis is particularly true of the plastic components that are the scalloped end caps for pergola horizontal beams. For example, the prior art pergola end cap of FIG. 1 is typical of at least some known pergola end caps. The pergola end cap 10 in FIG. 1 is substantially hollow with an interior 14 having dimensions adequate to accommodate the pergola beam end 18 within the opening 14. However, as mentioned above, when the end cap 10 is positioned on the pergola beam end 18 (as shown in FIG. 2), the esthetics of the resulting combination is less than desired due to the seam 22, the extended thickness 24 of the pergola end cap that protrudes outwardly from the line of the beam 18, and the likely visually detectable change in angle wherein the pergola end cap is tilted relative to the horizontal line of the beam 18, thus providing a visually displeasing angle 28 there between.

FIG. 3 shows another prior art pergola end cap 32 that provides a more pronounced scalloped effect but which also requires the end of the pergola beam 18 to be cut along a path 36 having a curve identical to the scalloping of the pergola end cap 32. Thus, in this prior art embodiment, the pergola end cap 32 has fins 40 that slidably contact the interior surfaces of the hollow pergola beam along the path 36. The attachment of the pergola end cap 32 is labor intensive due to the exactness by which the path 36 must be followed in cutting the pergola beam 18. Further, even if the cut corresponding to the path 36 is exact, an unsightly seam remains along the cut clearly indicating that the resulting combination of the pergola beam 18 and the end cap 32 is not a single unitary structure.

Accordingly, it is desirable to have plastic and/or composite pergola end caps that alleviate the undesirable effects of prior art pergola end caps such as those discussed hereinabove. In particular, it is desirable to have pergola end caps that: (a) substantially follow, in an esthetics manner, the horizontal beam line of the pergola beams to which they are attached, (b) are of an extended length to thereby accommodate more extensive or intricate scalloping, (c) are sufficiently durable where the end cap joins to the pergola beam so that, e.g., a torque applied to the junction between the pergola beam and the end cap by, e.g., a relatively heavy vine does not break, misalign, or disconnect the pergola end cap from its beam.

SUMMARY

The present invention includes novel plastic and/or composite pergola end caps for pergola beams wherein the end caps provide a visually pleasing effect of being integral with the pergola beams to which they are attached. Further, the present invention includes a method of manufacture of such pergola end caps, wherein the end caps can have more intricate and curved scalloping while at the same time being easy to install on the ends of pergola beams. In particular, the pergola end caps of the present invention fit over the squared off end of a pergola beam without requiring any custom cutting thereof. Thus, the pergola beam end fits into the hollow interior of the pergola end cap but also has the appearance of being unitary with the pergola beam. To accomplish this, it is an aspect of the present invention for the pergola end cap embodiments to include a raised collar surrounding the opening that receives the pergola beam end such that this raised collar forms a visually pleasing connection that allows the portion of the pergola end cap extending away from its attached beam to visually appear as part of the beam. Moreover, due to a sturdy connection with its beam, such end cap can extend a substantially greater distance than prior art pergola end caps that slidably attach over a squared off end of a pergola beam. The installation of the pergola end caps of the present invention is much easier and takes far less time than previous pergola end caps, e.g., prior art cap 32, that give the same basic look to the pergola beam. To install cap (32) a template must first be attached to the end of the pergola beam 18 (FIG. 3). Next a hand router is used to cut along the template to get the desired shape. Glue is applied to the pergola end cap and attached to the end of the pergola beam 18. After the glue is set any gaps or chips created in the routing process must be filled with glue to hide the defects. This process is very time consuming and gives a less than desirable effect. With the pergola end caps of the present invention the first step of the installation is to simply cut the pergola beam substantially perpendicular to the desired length. The next and final step is to apply glue to the inside of the collar (62) (the collar described hereinbelow) and slide onto the end of the pergola beam. Alternatively, the glue may be placed on the end of pergola beam and then slide the pergola end cap onto the end of the pergola beam having the glue thereon. Not only does this installation take substantially less time than prior art methods of attaching pergola end caps, but because it goes over a square cut, it saves material.

It is a further aspect of the present invention to provide a novel process for manufacturing such pergola end caps that are hollow and have a substantially increased length in the direction of the longitudinal axis of a pergola beam to which such an end cap is to be attached. In particular, the plastic injection process used in forming the pergola end caps according to the present invention have the cavities to form the pergola end caps in the movable portion of a pergola end cap mold rather than an immovable portion as is common in the manufacture of prior art pergola end caps.

In summary, pergola end caps according to the present invention can be characterized as having the following features:

(1) an opening at one end of a length of said end cap for receiving an end of a pergola beam, said beam having sides that extend along a longitudinal extent of the beam; wherein when said beam end is received in said opening, substantially most of said length extends beyond the end of the beam in a direction substantially parallel to the longitudinal extent of the beam;

(2) a collar surrounding said opening, wherein said collar has an extent along said length of approximately less than 50% of said length, and wherein said collar extends outwardly in perpendicular directions from said beam sides; and (3) a beam extension portion extending along said length between said collar and a free end of said end cap opposite said opening, said beam extension portion having at least one exterior surface extent that contacts said collar on an opposite side of said collar from said opening, wherein said exterior surface visually appears to be an extension of a corresponding surface of the beam where the beam enters said opening.

Other features and benefits of the present invention will become evident from the detailed description hereinbelow and the accompanying drawings.

DETAILED DESCRIPTION

Figure 1:
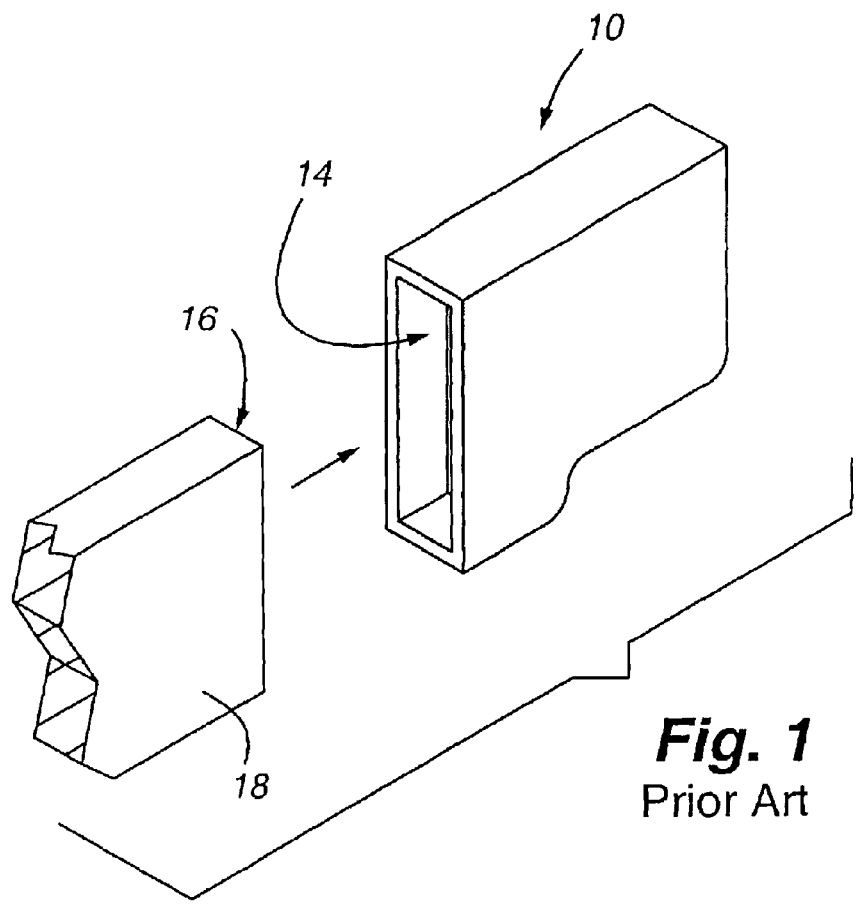
FIG. 1 is a perspective view of a prior art pergola end cap 10 showing how it attaches to a pergola beam 18.
Figure 2:
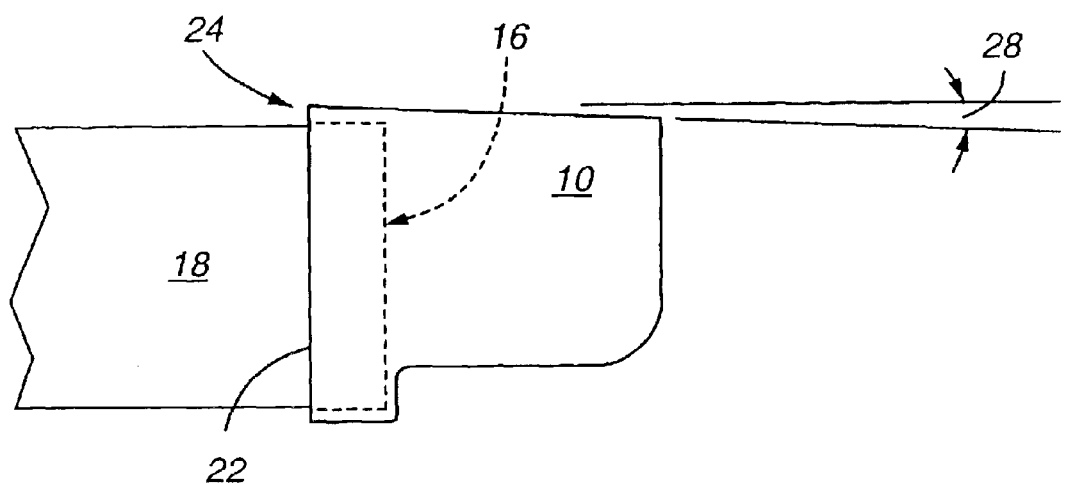
FIG. 2 is a side view of the pergola end cap 10 of FIG. 1 attached to the pergola beam 18 wherein the two are misaligned as represented by the angle 28.
Figure 3:
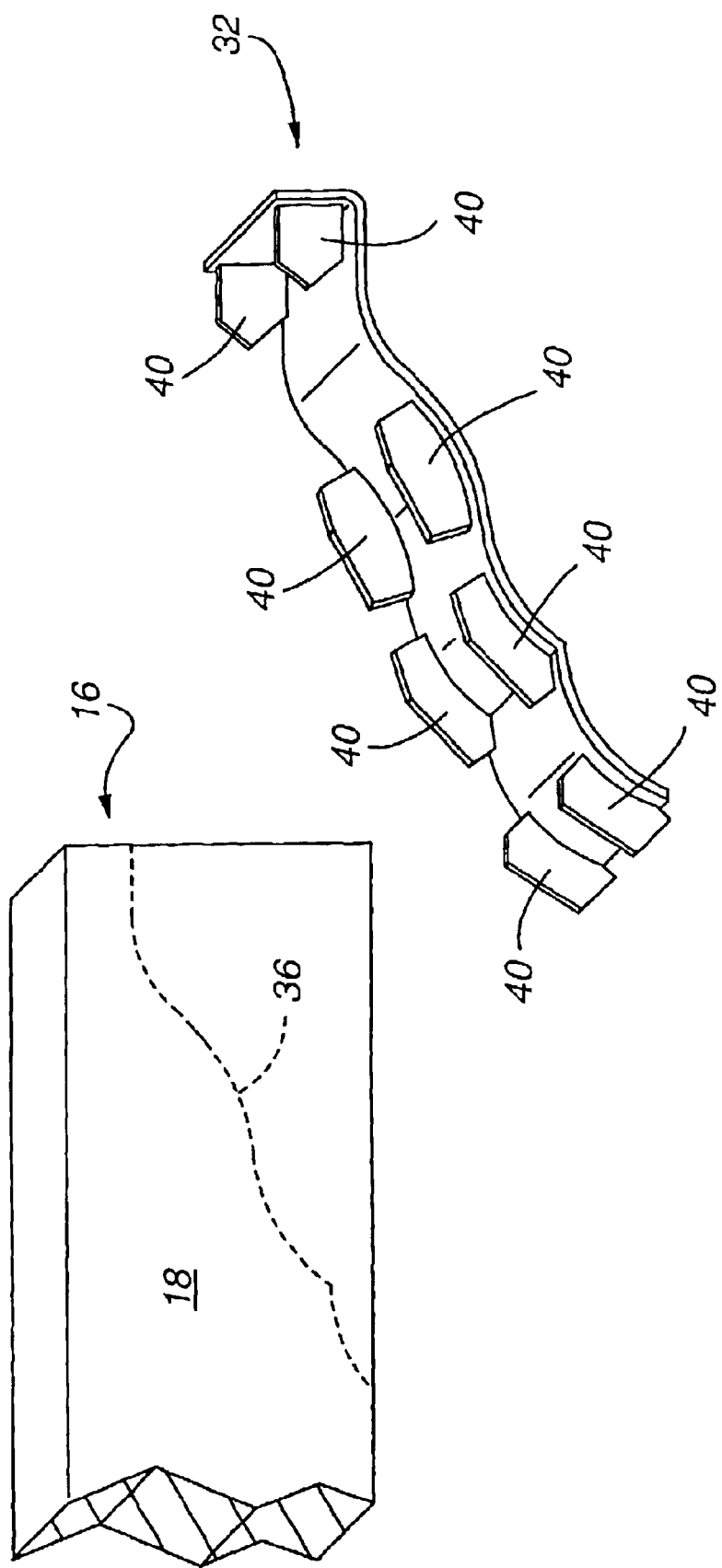
FIG. 3 shows a second prior art pergola end cap 32.
Figure 4:
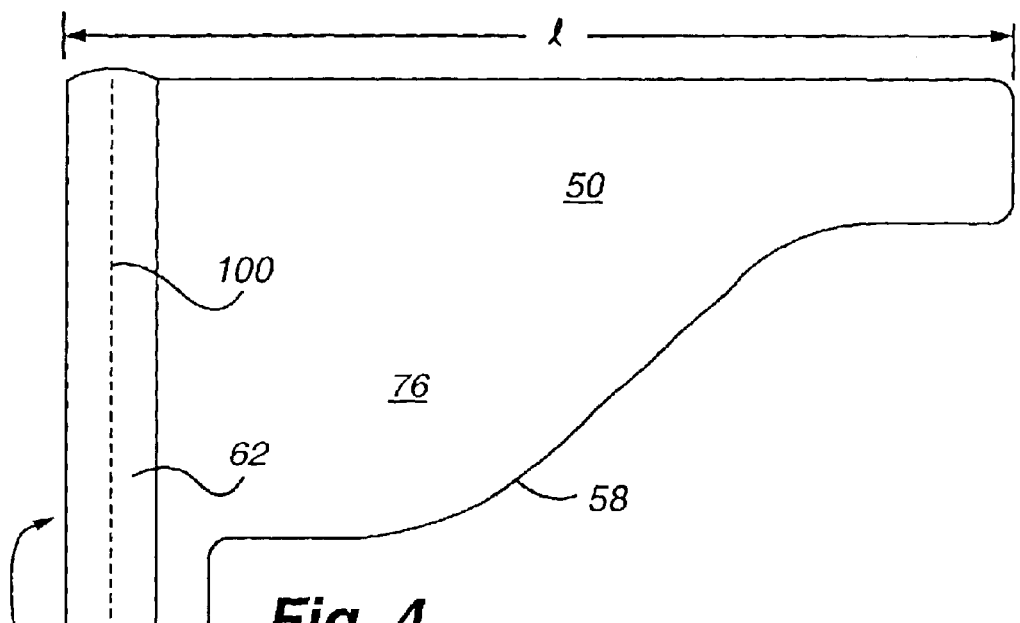
FIG. 4 is a perspective view of one embodiment of a pergola end cap 50 according to the present invention.
Figure 5:
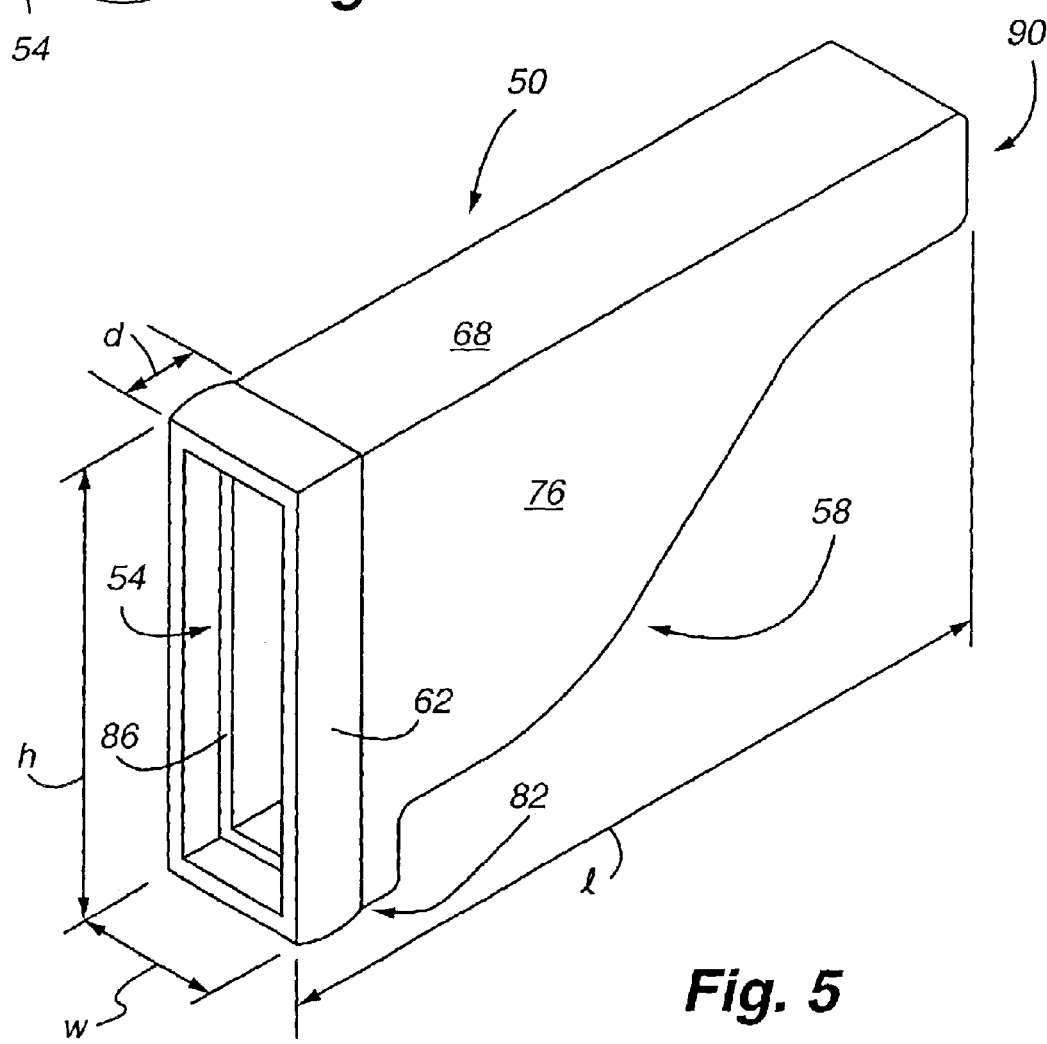
FIG. 5 is another perspective view of the pergola end cap 50 shown in FIG. 4.

FIGS. 4 and 5 show a first embodiment of a pergola end cap 50 according to the present invention. Such pergola end caps 50 may be provided in various sizes dependent upon, e.g., the size of the pergola beam 18 upon which the end cap is to fit. In particular, the opening 54 that receives an end 16 of a pergola beam can have at least, but not limited to, the following height (h) and width (w) pairs: 1.5 inches by 5.5 inches, 2 inches by 6 inches, and 2 inches by 8 inches. Additionally, it is important to note that the length (l) of the end cap 50 may be 7 inches or longer, and at least in one embodiment, approximately 13 inches.

Figure 7A:
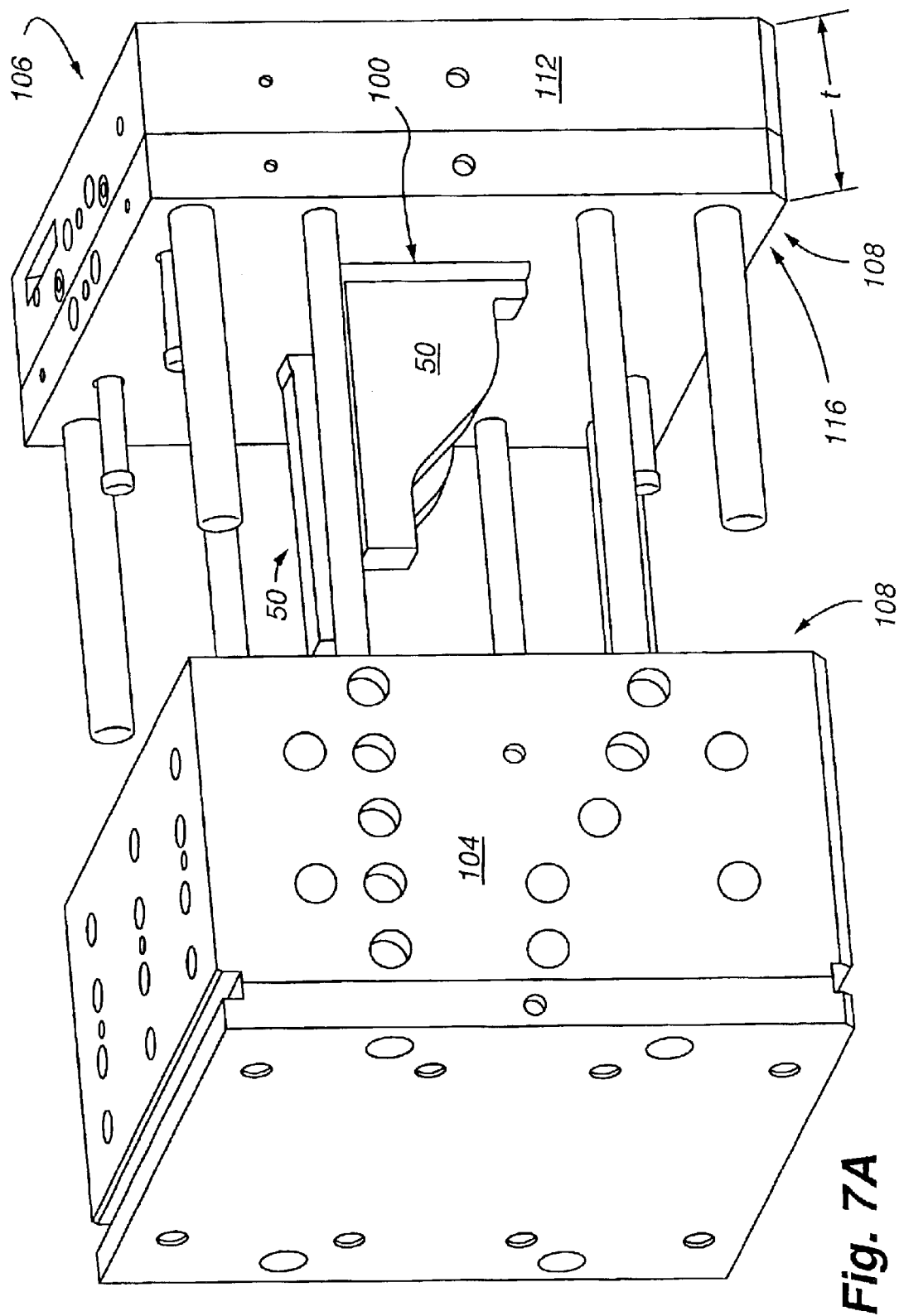
FIGS. 7A through 7D show the components of an injection mold 108 for the producing parts such as pergola end caps of the present invention. In particular, these figures show how molded parts (e.g., end caps 50) are released from the mold 108.
Figure 7B:
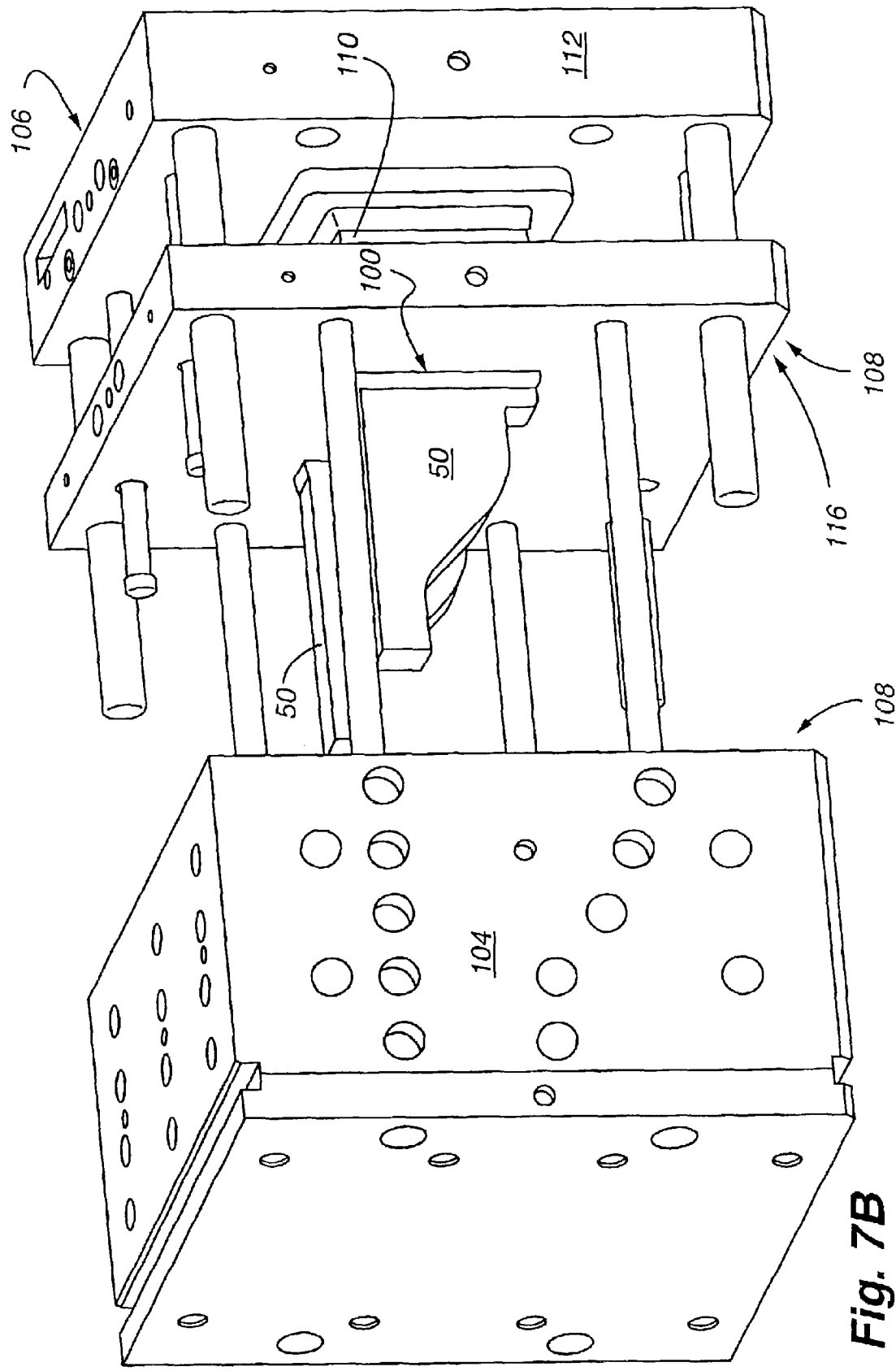
Figure 7C:
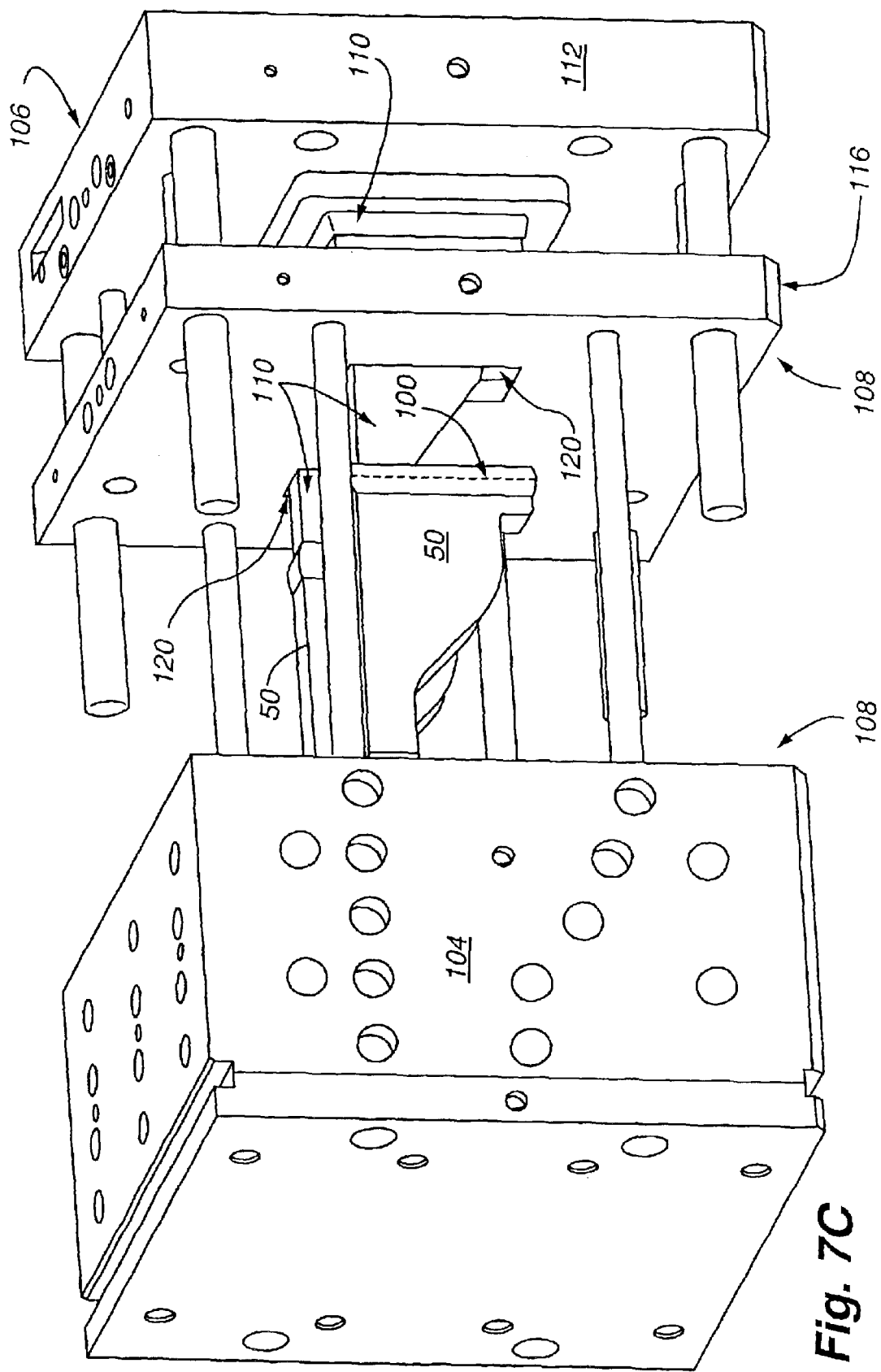
Figure 7D:
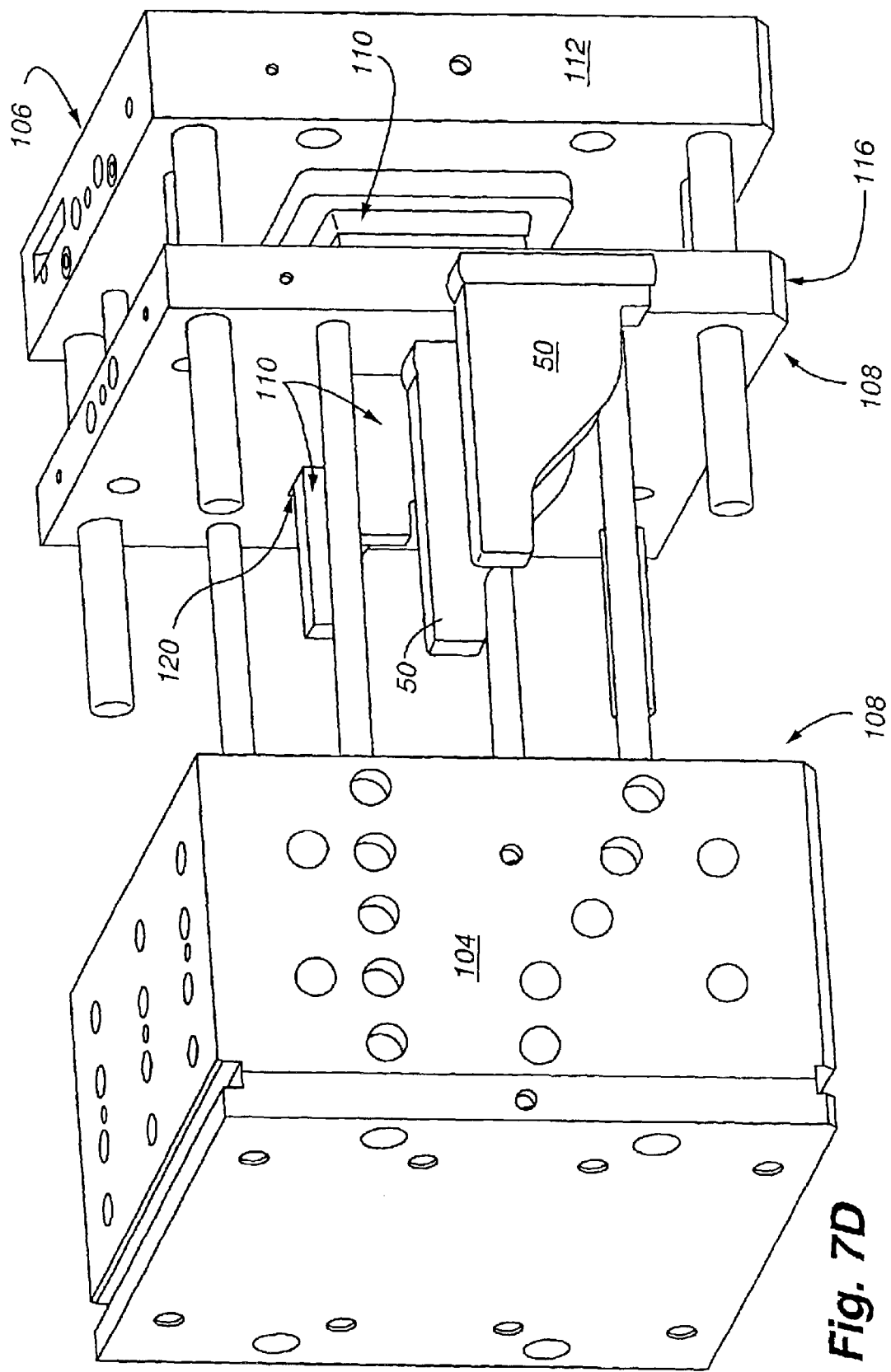

Pergola end caps 50 according to the present invention may include various scalloped configurations along their lower surface 58. The dimensions and more extensive scalloping are important aspects of the present invention in that prior to the present invention, such end caps 50 have been very difficult to cost effectively manufacture. Some plastics and composite materials typically used for pergola components (e.g., Poly Vinyl Chloride, ABS, polyethelene and wood flour composited with various polymers) do not flow well when injected into molds according to the conventional techniques of having the cavities in the stationary or immobile portions of the mold. However, the end caps 50 of the present invention are formed by having the cavities (not shown) in the movable portion (104, FIG. 7A) of a mold 108 rather than the immovable portion 112. Thus, the plastic or composite material flows a much shorter distance to reach parting line (i.e., the area where the two halves of the mold that meet when the mold closes) when the material is injected into the part cavity. A more detailed discussion of this aspect of the invention is provided further below.

Figure 6A:
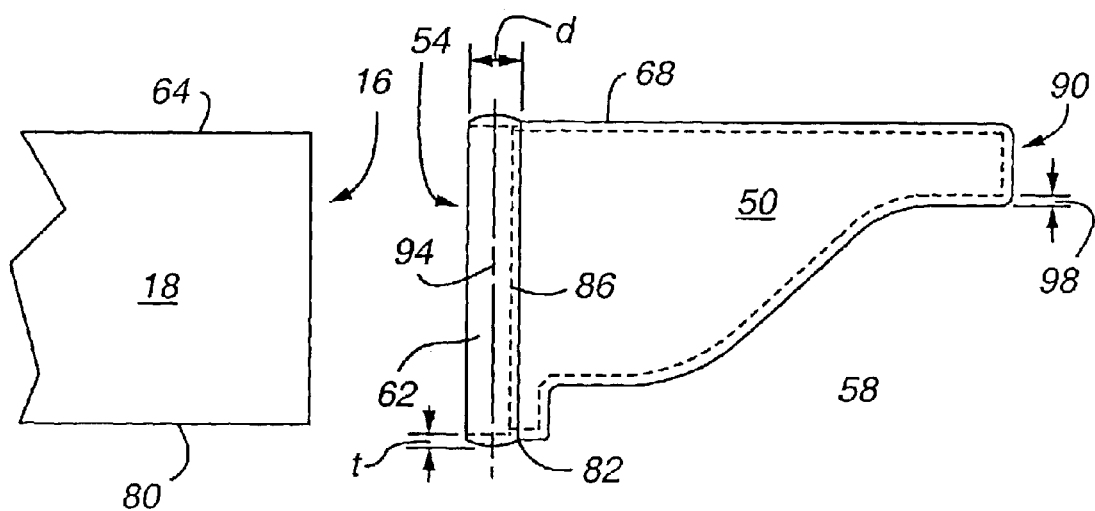
FIGS. 6A and 6B show, respectively, a side and top view of an alternative embodiment of a pergola end cap according to the present invention.
Figure 6B:
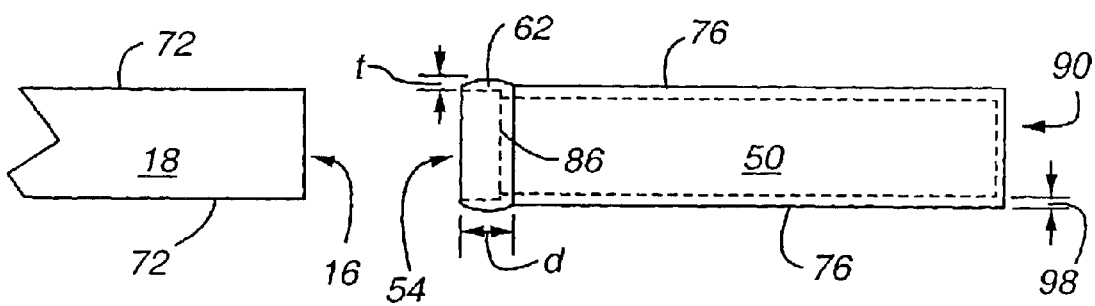

Two representative embodiments of pergola end caps 50 according to the present invention are shown, respectively, in FIGS. 5 and 6, wherein the primary difference between the two embodiments is the differently scalloped lower surface 58. Each of these embodiments includes a raised collar 62 that surrounds the opening 54 and also extends outwardly further than any of the adjacent exterior surfaces of the pergola end cap 50. Said another way, the raised collar 62 has sufficiently increased external dimensions so that when a pergola beam 18 is secured within the opening 54, each of the exterior services of the pergola beam 18 appears to extend through the raised collar 62 and continue as the remainder of the pergola end cap. Thus, there is no abrupt change in the size or positioning of the respective pergola exterior surfaces adjacent to and contacting the raised collar 62. More precisely, when the pergola end cap 50 is connected to its pergola beam 18, top surface 64 of the pergola beam is visually in line with the top surface 68 of the pergola end cap 50, the pergola beam sides 72 are visually aligned with the pergola end cap sides 76, and the pergola beam surface 80 visually aligns with at least the edge 82 where the scalloped lower surface 58 joins with the raised collar 62. Accordingly, it is an aspect of the present invention that the raised collar 62 has a sufficient depth (d) and thickness (t) to adequately secure the pergola beam 18 and the pergola end cap 50 together so that: (i) corresponding exterior surfaces on each side of the raised collar 62 are substantially automatically aligned when the end 16 of the beam 18 is fully received into the opening 54 so that the beam end 16 contacts the beam stop wall 86, and (ii) the depth of the opening 54 from its exterior perimeter to the stop wall 68 is of sufficient length so that misalignment is substantially eliminated and there is sufficient overlap of the pergola beam 18 near its end 16 to maintain proper attachment of the pergola end cap 50 to the beam even under, e.g., heavy vines near the pergola end cap free end 90 that could produce a disconnecting torque at the raised collar. In particular, the exterior depth (d) of the raised collar is between 10% and 50% of the entire length (l) of the pergola end cap 50, and at least in one embodiment, between 10% and 25% of the entire length, and in one embodiment, between 10% and 15%. Further, the depth of the opening 54 from its exterior perimeter to the stop wall 86 is approximately 8% to 10% of the length (l) of the pergola end cap 50. Moreover, the thickness (t) of the raised collar 62 (e.g., at the cutting plane whose representation is shown in FIG. 6A as the dashed line 94) is at least approximately the thickness 98 of the remainder of the pergola end cap, and in some embodiments, the thickness (t) can be 25% to 50% greater than the thickness 98.

A more precise description of the process for manufacturing pergola end caps according to the present invention will now be described with reference to FIGS. 7A through 7D which show how end caps 50 are removed from the mold 104 once the movable portion 104 separates from the immovable portion 112. However, to more fully appreciate the present invention, further description of how mold injection parts are typically produced will be described. Generally, parts that are injection molded are filled at or very close to parting line by a flowable material that subsequently cures or solidifies in the mold thereby creating the desired part, as one skilled in the art will understand. In an injection molding process, there is an immovable or stationary side of a mold and movable side to the mold. Typically, the immovable side contains the recess or cavity into which the flowable material flows to form the resulting part, and the movable side provides the (any) projection which is inserted into the cavity in order to produce an interior in the part that corresponds to the projection. The movable and immovable sides meet at what is known as the "parting line". The parting line corresponds to a cross section of the resulting part, wherein for each side (S) of the part from the parting line, no feature of S increases in a dimension (as the distance from the parting line increases) in a manner that precludes the resulting part from disengaging from the mold when the two halves of the mold come apart. In one embodiment of the pergola end caps 50 of the present invention, such a parting line corresponds with the largest exterior dimension of the collar 62 (in FIGS. 4 and 7, the parting line is labeled 100). The length (l) of the pergola cap 50 according to the present invention would be very hard to fill with the flowable material if the cavity is substantially in the immovable portion of the mold instead of the movable portion. This is because the flowable material has too far to travel from the time the material leaves the nozzle used for injecting the material into the mold and enters the mold portion at or close to parting line. That is, since the nozzle (not shown) for injecting the flowable material is attached to the back side 106 of the immovable mold portion 112 (this back side being occluded in FIGS. 7A–7D), and since the flowable material enters the mold cavity at substantially the parting line 100 (as one skilled in the art will understand), the dimension "t" (FIG. 7A) is approximately the distance that the flowable material must travel before entering the part cavity. Thus, if the part cavity is in the immovable portion 112, and this cavity has an extensive length (e.g., the pergola end caps 50) that causes the dimension t to substantially increase, then the distance that the flowable material must travel in order to fully fill the part before solidifying is approximately 2t. For parts where t is in a range of approximately 8 inches or greater, it has been discovered that such parts are difficult to produce with a consistent high quality due to the cooling of the flowable material while traveling a distance of up to approximately 2t. Thus, by providing the part cavity in the movable mold portion 104 of the mold 108 (and the projection(s) 110 on the immovable portion 112), as in the present invention, the dimension t can be substantially reduced since it is no longer dependent on any dimension of the part, and accordingly, the distance traveled by the flowable material (while cooling) is substantially reduced. In fact, for embodiments of the present invention t may be in the range of 2.5" to 9". Therefore, the present invention produces parts (e.g., pergola end caps 50) that are more consistently of high quality than prior art injection molding techniques.

Additionally, when parts are typically pushed out of a prior art injection mold, the pushing is usually done with ejector pins, which leave round marks where they contact the part. With the mold cavity substantially in the movable side 104 of the mold 108 this creates a problem because the ejector pin marks would be on the outside of the part (e.g., end caps 50) where they would be visible as one skilled in the art will understand. To over come this problem, the method of the present invention includes a stripper plate 116 in the mold 108, wherein the stripper plate has an opening 120 (FIG. 7C) that matches the portion of the raised collar 62 on the same side of parting line 100 as the stripper plate 116. When the mold 108 opens, the stripper plate 116 moves toward the movable portion 104 thereby pulling the parts (e.g., end caps 50) off of the projections 110 so there are no unsightly marks on the outside of the parts.

Thus, the combination of the mold cavity being substantially in the movable portion of the mold 108 together with the stripper plate 116 for removing parts from the mold is a novel feature of the present invention.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A pergola end cap for fitting on an end of a pergola beam, said beam having sides that extend along a longitudinal extent of the beam, comprising:

an opening at one end of a length of said end cap for receiving an end of the end of the pergola beam;

wherein said opening is operable for receiving less than most of the longitudinal extent of the beam;

a collar substantially surrounding said opening, wherein said collar has an extent along said length of approximately less than 50% of said length;

a beam extension portion extending along said length between said collar and a free end of said end cap opposite said opening, said beam extension portion having an exterior surface extent that contacts said collar on an opposite side of said collar from said opening, wherein said exterior surface extent visually appears to be an extension of a corresponding surface of the beam where the beam enters said opening; and wherein said collar extends outwardly in a direction perpendicular to said exterior surface extent.

2. The pergola end cap of claim 1, wherein the extent of said collar along said length is approximately greater than 10% of said length.

3. The pergola end cap of claim 1, wherein the extent of said collar along said length is approximately less than 25% of said length.

4. The pergola end cap of claim 1, wherein the extent of said collar along said length is approximately less than 15% of said length.

5. The pergola end cap of claim 1, wherein said opening includes dimensions for aligning a planar surface of the beam with a surface of said beam extensions, when the beam is inserted into said opening.

6. The pergola end cap of claim 5, wherein at least one of the dimensions is delimited by a beam stop.

7. The pergola end cap of claim 1, wherein said opening is configured for overlapping the beam longitudinal extent an amount effective for aligning the beam with said beam extension so that when the beam is inserted into said opening each of the sides of the beam is substantially coincident with a surface of said beam extension.

8. The pergola end cap of claim 1, wherein the depth of said opening from its exterior perimeter to an interior stop is approximately 8% to 10% of said length.

9. The pergola end cap of claim 1, wherein said collar has a thickness in a range of 25% to 50% greater than a thickness of said beam extension.

10. A pergola end cap for fitting on an end of a pergola beam, said beam having an exterior that extends along a longitudinal extent of the beam, comprising:

an opening at one end of a length of said end cap for receiving the end of the pergola beam;

wherein said opening includes an interior having dimensions for providing the beam in a predetermined alignment with said end cap;

a collar substantially surrounding said opening, wherein said collar has an extent along said length of approximately less than 50% of said length;

a beam extension portion extending along said length between said collar and a free end of said end cap opposite said opening, said beam extension portion having an exterior surface that contacts said collar on an opposite side of said collar from said opening, wherein said predetermined alignment includes said exterior surface visually appearing to be an extension of the exterior of the beam at said opening; and wherein said collar extends outwardly in a direction perpendicular to said exterior surface.

11. The pergola end cap of claim 10, wherein said collar is raised from the exterior surface substantially wherever the exterior surface contacts the collar.

12. The pergola end cap of claim 10, wherein the pergola beam is provided in said opening according to the steps of:

applying glue to one of the interior of the opening, and the beam end; and sliding the beam end into said opening until a portion of said interior is contacted that substantially prevents the beam from further entering said opening.

13. The pergola end cap of claim 10, wherein a side of the collar provides walls for said opening adjacent the one end of the end cap.

14. The pergola end cap of claim 10, wherein said collar has a thickness of approximately 25% to 50% greater than a thickness of the beam extension portion.

15. A pergola end cap for fitting on an end of a pergola beam, said beam having an exterior that extends along a longitudinal extent of the beam, comprising:

an opening means at one end of a length of said end cap for receiving the end of the pergola beam;

wherein said opening means includes dimensions for providing the beam in a predetermined alignment with said end cap;

a collar means for substantially surrounding said opening, wherein said collar means has an extent along said length of approximately less than 50% of said length;

a beam extension means for extending along said length between said collar means and a free end of said end cap opposite said opening means, said beam extension means having an exterior surface that contacts said collar means on an opposite side of said collar means from said opening means;

wherein said collar means extends outwardly in a direction perpendicular to said exterior surface; and wherein said predetermined alignment provides for said exterior surface as an apparent extension of the exterior of the beam at said opening means.

* * * * *

UNITED STATES PATENT AND TRADEMARK OFFICE
CERTIFICATE OF CORRECTION

PATENT NO. : 6,918,213 B2
DATED : July 19, 2005
INVENTOR(S) : Michael G. Burkart It is certified that error appears in the above-identified patent and that said Letters Patent is hereby corrected as shown below:

Title page,
Please delete Item [60], Related U.S. Application Data.

Signed and Sealed this

Thirteenth Day of December, 2005

JON W. DUDAS
*Director of the United States Patent and Trademark Office*